United States Patent
Cho et al.

(10) Patent No.: US 12,505,044 B2
(45) Date of Patent: Dec. 23, 2025

(54) STORAGE DEVICE BASED ON FLASH MEMORY AND METHOD FOR MANAGING PREFETCH DATA THEREOF

(71) Applicant: Samsung Electronics Co., Ltd., Suwon-si (KR)

(72) Inventors: Kyungjune Cho, Suwon-si (KR); Donggil Kang, Suwon-si (KR); Minsik Oh, Suwon-si (KR); Yoon Soo Kim, Suwon-si (KR); Jongmin Kim, Suwon-si (KR); Kyungsik Um, Suwon-si (KR); Myunggwan Jeong, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 18/643,160

(22) Filed: Apr. 23, 2024

(65) Prior Publication Data
US 2025/0130948 A1    Apr. 24, 2025

(30) Foreign Application Priority Data
Oct. 23, 2023 (KR) .................. 10-2023-0141871

(51) Int. Cl.
    *G06F 12/0862* (2016.01)
(52) U.S. Cl.
    CPC .. *G06F 12/0862* (2013.01); *G06F 2212/6022* (2013.01)
(58) Field of Classification Search
    None
    See application file for complete search history.

(56) References Cited

U.S. PATENT DOCUMENTS

| | | | |
|---|---|---|---|
| 9,886,384 B2 | 2/2018 | Kim et al. | |
| 10,025,717 B1 * | 7/2018 | Menezes | ............. G06F 12/0862 |
| 10,909,012 B2 | 2/2021 | Yang | |
| 10,997,080 B1 | 5/2021 | Eliash et al. | |
| 2008/0147978 A1 | 6/2008 | Pesavento et al. | |

(Continued)

FOREIGN PATENT DOCUMENTS

| | | |
|---|---|---|
| CN | 108733583 A | 11/2018 |
| EP | 0811931 B1 | 5/2003 |

(Continued)

OTHER PUBLICATIONS

Extended European Search Report dated Feb. 25, 2025 issued in European Patent Application No. 24198120.8-1218.

*Primary Examiner* — Charles J Choi
(74) *Attorney, Agent, or Firm* — Harness, Dickey & Pierce, P.L.C.

(57) ABSTRACT

Disclosed is a storage device. The storage device includes: a memory device; a buffer memory configured to store partial data among data stored in the memory device; and a memory controller configured to determine prefetch logical addresses expected to be received sequentially after sequential logical addresses are received from a host, to read prefetch data corresponding to the prefetch logical addresses from the memory device to store the prefetch data as a prefetch group of in the buffer memory, and to release the prefetch group from the buffer memory in response to a logical address discontinuous with the logical addresses being received from the host.

20 Claims, 14 Drawing Sheets

(56) References Cited

U.S. PATENT DOCUMENTS

| | | |
|---|---|---|
| 2016/0378669 A1 | 12/2016 | Li et al. |
| 2021/0373907 A1 | 12/2021 | Liang et al. |
| 2022/0100664 A1 | 3/2022 | Ahmad et al. |
| 2022/0261349 A1 | 8/2022 | Kim et al. |
| 2023/0063123 A1 | 3/2023 | Hyun |
| 2023/0081829 A1 | 3/2023 | Ryu et al. |
| 2023/0195474 A1 | 6/2023 | Basso et al. |

FOREIGN PATENT DOCUMENTS

| | | |
|---|---|---|
| EP | 2396790 B1 | 8/2017 |
| KR | 10-2070136 B1 | 11/2014 |
| KR | 10-2023-0031123 A | 3/2023 |
| KR | 10-2023-0040057 A | 3/2023 |

* cited by examiner

STORAGE DEVICE BASED ON FLASH MEMORY AND METHOD FOR MANAGING PREFETCH DATA THEREOF

CROSS-REFERENCE TO RELATED APPLICATIONS

This application claims priority under 35 U.S.C. § 119 to Korean Patent Application No. 10-2023-0141871 filed on Oct. 23, 2023, in the Korean Intellectual Property Office, the disclosures of which are incorporated by reference herein in their entireties.

BACKGROUND

Example embodiments relate in general to a semiconductor memory device, and more particularly, relate to a storage device based on a flash memory and/or a prefetch data management method thereof.

A semiconductor memory may be mainly classified as a volatile memory or a non-volatile memory. Read and/or write speeds of the volatile memory (for example, a dynamic random access memory (DRAM) and/or a static random access memory (SRAM)) are fast, but data stored in the volatile memory disappears when power is turned off. In contrast, the non-volatile memory may retain data even when the power is turned off. Therefore, the non-volatile memory may be used to store contents that must be preserved regardless of whether power is supplied or not.

A representative example of the non-volatile memory includes a flash memory. The flash memory is widely used as a storage medium for audio and/or video data in information devices such as a computer and/or a smartphone. Recently, high-capacity, high-speed input/output, and/or low-power technologies for flash memory are being actively researched for installation in mobile devices such as the smartphone.

The flash memory may have disadvantages in which writing and erasing speeds are slow compared to a reading speed, the number of usage times is limited, and overwriting is not possible. Therefore, a storage device based on the flash memory is intended to improve speed by prefetching frequently used data into buffer memory. However, if the prefetched data in the buffer memory is not managed, speed improvement may be affected.

SUMMARY

Various example embodiments provide a storage device efficiently managing a prefetch cache by grouping data prefetched in a prefetch cache of a buffer memory and by releasing all prefetched data in group at once.

According to some example embodiments, a storage device includes: a memory device; a buffer memory configured to store partial data among data stored in the memory device; and a memory controller configured to determine prefetch logical addresses expected to be received sequentially after sequential logical addresses are received from a host, to read prefetch data corresponding to the prefetch logical addresses from the memory device to store the prefetch data as a prefetch group of in the buffer memory, and to release the prefetch group from the buffer memory in response to a logical address discontinuous with the logical addresses being received from the host.

Alternatively or additionally according to various example embodiments, a prefetch management method of a storage device includes: performing a first prefetch operation in response to receiving a first sequential workload from a host; boosting a speed of the first prefetch operation based on the first sequential workload; monitoring whether a prefetch hit occurs in first prefetch group data stored in a buffer memory by the first prefetch operation; releasing prefetch data in which the prefetch hit occurs among the first prefetch group data by single prefetch aborting; and releasing the first prefetch group data by mass prefetch aborting in response to receiving a second workload discontinuous with the first sequential workload from the host.

Alternatively or additionally according to various example embodiments, a storage device includes: a memory device; a buffer memory including a prefetch cache configured to store prefetch data corresponding to a workload received from a host; and a memory controller configured to read data corresponding to a sequential workload from the memory device and to store the data in the prefetch cache in response to the sequential workload being received from the host. The memory controller is configured to perform a first prefetch operation corresponding to the first workload in response to a first sequential workload is received from the host, to boost a speed of the first prefetch operation based on a size of the prefetch cache, and to release all prefetch data prefetched by the first prefetch operation from the prefetch cache by mass prefetch aborting in response to a second workload discontinuous with the first workload being received from the host.

BRIEF DESCRIPTION OF THE DRAWINGS

The above and other objects and features will become apparent by describing in detail embodiments thereof with reference to the accompanying drawings.

DETAILED DESCRIPTION

Below, various example embodiments will be described in detail and clearly to such an extent that an ordinary one in the art easily implements the inventive concepts.

Figure 1:
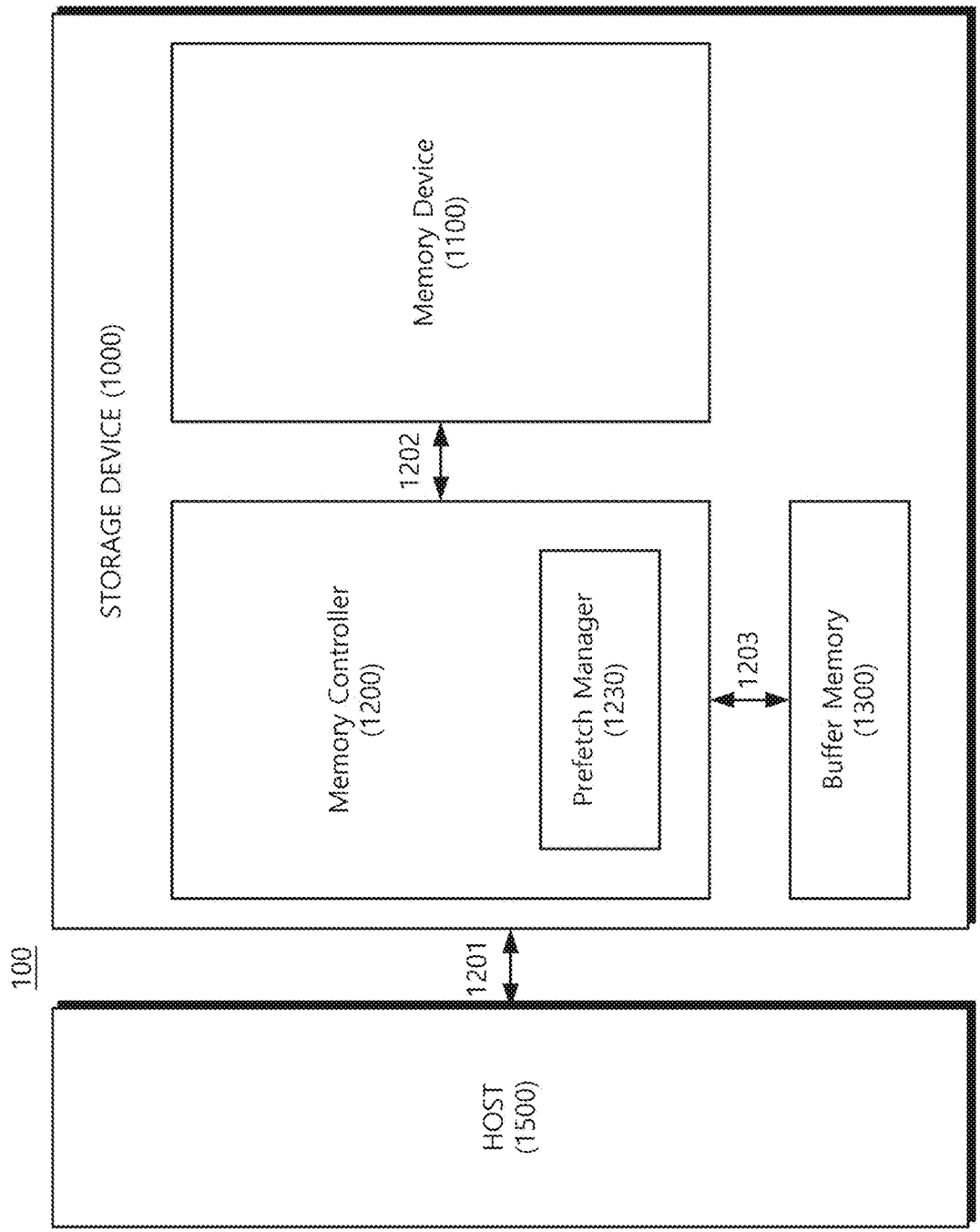
FIG. 1 is a block diagram illustrating a user device according to various example embodiments.

FIG. 1 is a block diagram illustrating a user device according to some example embodiments. Referring to FIG. 1, the user device 100 may include a storage device 1000 and a host 1500. The storage device 1000 and the host 1500 may be connected through a host interface 1201. The host interface 1201 may be or may include (or be included in) a standard interface such as one or more of ATA, SATA, PATA, USB, SCSI, ESDI, IEEE 1394, IDE, and/or card interface, etc.

According to some example embodiments, the storage device 1000 may be or may include (or be included in) a storage device based on a non-volatile memory. For example, the storage device 1000 may include a memory device 1100, a memory controller 1200, and a buffer memory 1300. The memory device 1100 may be or include a non-volatile memory such as a flash memory or phase change memory (PRAM). When the memory device 1100 is or includes a flash memory, the storage device 1000 may be or include a flash storage device based on the flash memory. For example, the storage device 1000 may be or include an SSD, UFS, and/or memory card, etc. The buffer memory 1300 may include volatile memory (for example, DRAM and/or SRAM).

According to some example embodiments, the memory device 1100 may be connected to the memory controller 1200 through a memory interface 1202. The memory device 1100 may include a memory cell array and/or a peripheral circuit. The peripheral circuitry may include all analog and/or digital circuits required to or used store and/or read data in the memory cell array.

According to some example embodiments, the peripheral circuit may receive external power from the memory controller 1200 and may generate various levels of internal power. The peripheral circuit may receive commands, addresses, and data from the memory controller 1200, and may store the data in the memory cell array according to the control signals. Additionally or alternatively, the peripheral circuit may read data stored in the memory cell array and provide the data to the memory controller 1200.

According to some example embodiments, the memory cell array may include a plurality of memory blocks. Each memory block may have a vertical three-dimensional structure; however, example embodiments are not limited thereto. Each memory block may include a plurality of memory cells. Multi-bit data may be stored in each memory cell. For example, the memory device 1100 may be or may include a TLC flash memory capable of storing 3 bits of data in one memory cell; however, example embodiments are not limited thereto.

According to some example embodiments, the memory cell array may be located next to or above the peripheral circuit, for example due to the design arrangement structure. The structure in which the memory cell array is located above the peripheral circuit may be called a COP (cell on peripheral) structure. The memory cell array may be manufactured as a separate chip from the peripheral circuit. The upper chip including the memory cell array and the lower chip including the peripheral circuit may be connected to each other using a bonding method. This structure may be called C2C (chip to chip) structure. However, example embodiments are not limited thereto.

According to some example embodiments, the memory controller 1200 may be connected between the memory device 1100 and the host 1500. Additionally or alternatively, the memory controller 1200 may be connected between the buffer memory 1300 and the host 1500. The memory controller 1200 may control read and/or write operations of the memory device 1100 and/or the buffer memory 1300 in response to a request from the host 1500. The memory controller 1200 may receive host data from the host 1500 and may provide the host data to the memory device 1100 and/or the buffer memory 1300.

According to some example embodiments, the memory controller 1200 may include a control unit and a work memory. The control unit may control overall operations of the memory controller 1200. For example, the control unit may control a flash translation layer (FTL) to perform an address mapping operation. The control unit may be or may include a commercially available and/or custom microprocessor.

According to some example embodiments, the work memory may be cache memory (for example, an SRAM and/or a DRAM). The work memory may serve as a buffer memory that temporarily stores data. Additionally or alternatively, the work memory may be or may include a driving memory of the memory controller 1200. The work memory may drive a flash translation layer (FTL).

According to some example embodiments, the FTL may be or may include firmware and/or a program for efficiently managing the memory device 1100. The memory device 1100 may not support an overwrite function different from a hard disk drive. Therefore, the memory device 1100 may perform the following process while updating data written to the page. In some examples, the memory device 1100 may copy all valid data in the first memory block to which the written page belongs to an empty second memory block. In some examples, the memory device 1100 may erase the first memory block and make it an empty memory block. The memory device 1100 may perform a large number of page copy operations (for example, a page read operation and/or a page write operation) and erase operations while going through this process.

According to some example embodiments, the FTL may be used between the host 1500 and the memory device 1100 to reduce a number of page copy and erase operations. The FTL may perform an address mapping function, a garbage collection function, and a wear leveling function, etc. When an overwrite request is received from the host 1500, the address mapping function may write the corresponding data to another empty page instead of overwriting the original page, thereby reducing additional page copy and block erase operations. For this purpose, an address mapping table having a specified size must be maintained in the work memory and the buffer memory 1300. Through this, the FTL may manage an operation of mapping a logical address received from the host 1500 to a physical address in the memory device 1100.

According to some example embodiments, the memory controller 1200 may include a prefetch manager 1230. The prefetch manager 1230 may store (or prefetch) prefetch data corresponding to a host workload among data stored in the memory device 1100 in the buffer memory 1300 based on the host workload received from the host 1500. When the host workload is sequential, the prefetch manager 1230 may connect the prefetch data by links and may manage the links as prefetch group data. When a host workload, which is discontinuous with (e.g., not sequential with) the previous sequential host workload, is received, the prefetch manager 1230 may release (and/or delete) the prefetch group data from the buffer memory 1300 at once. Accordingly, the buffer memory 1300 may quickly secure empty space for prefetching, and performance of the storage device 1000 may be improved.

According to some example embodiments, the buffer memory 1300 may be connected to the memory controller 1200 through a buffer interface 1203. For example, the buffer memory 1300 may be used to store (or temporarily store) data to be stored in or read from the memory device 1100. Additionally or alternatively, a cache area capable of storing cache data may be allocated to the buffer memory 1300. The buffer memory 1300 may be implemented with a DRAM and/or a SRAM, etc. The buffer memory 1300 may be included in the memory device 1100 or the memory controller 1200.

According to some example embodiments, the host 1500 may include a processor and a host memory. The processor and the host memory may be connected via an address/data bus. The host 1500 may be or include (or be included in) a personal digital assistance (PDA), a computer, a digital audio player, a digital camera, and/or a mobile phone, etc. The host memory may be or include or be included in a non-volatile or volatile memory in the form of one or more of a cache, a ROM, a PROM, an EPROM, an EEPROM, a flash, a SRAM, a DRAM, or the like.

According to some example embodiments, the host memory may drive a plurality of software and/or firmware. For example, the host memory may drive one or more of an operating system (OS), applications, a file system, a memory manager, and I/O drivers, etc.

Figure 2:
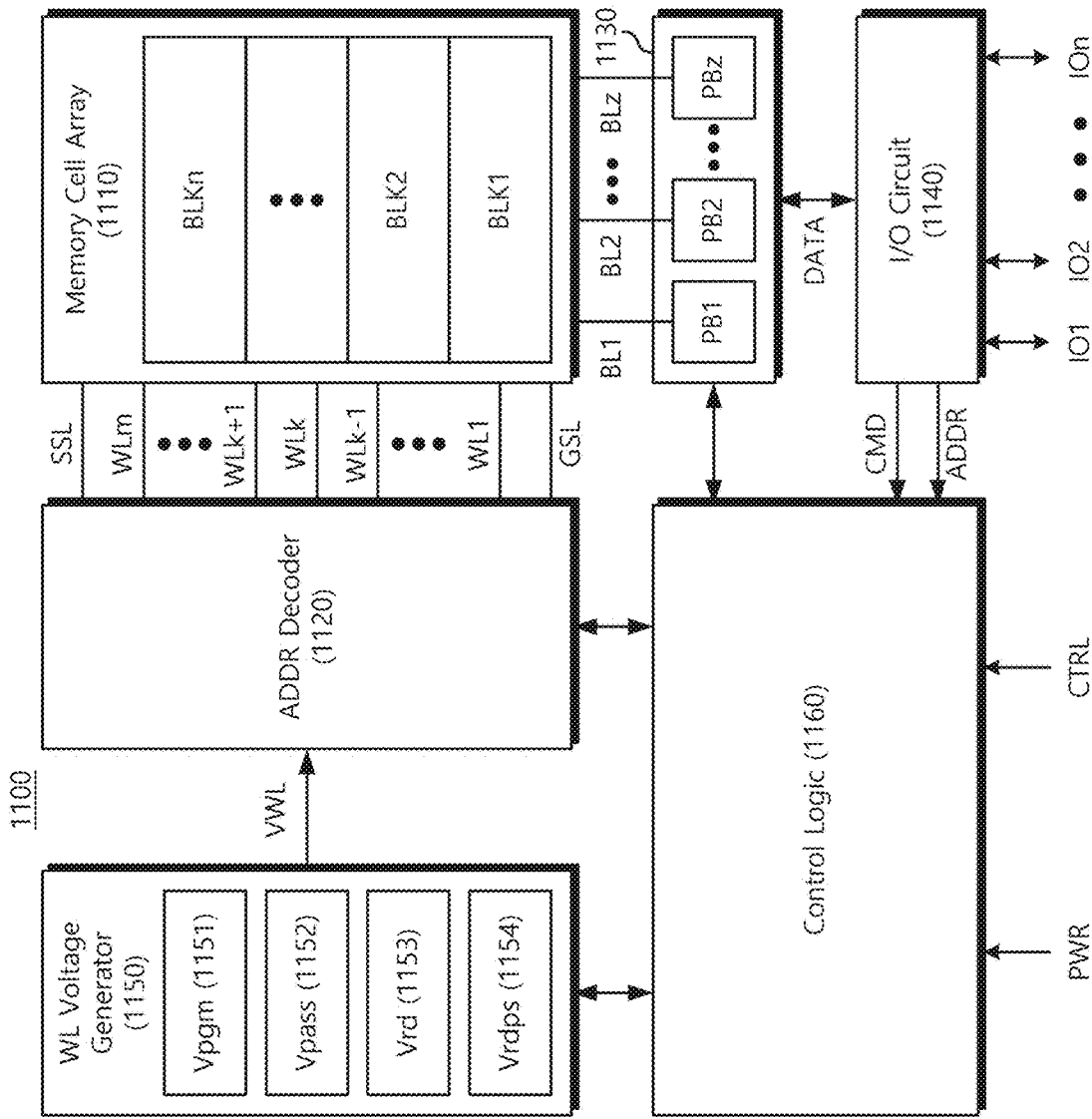
FIG. 2 is a block diagram illustrating as some example embodiments of the memory device illustrated in FIG. 1.

FIG. 2 is a block diagram illustrating as various example embodiments of the memory device illustrated in FIG. 1. The storage device 1000 of FIG. 1 may be a flash storage device based on flash memory. For example, the storage device 1000 may be implemented as or include one or more of an SSD, UFS, and/or memory card, etc.

Referring to FIGS. 1 and 2, the memory device 1100 may include a memory cell array 1110 and a peripheral circuit 1115. The peripheral circuit 1115 may include an address decoder 1120, a page buffer circuit 1130, an input/output circuit 1140, a word line voltage generator 1150, and control logic 1160.

According to some example embodiments, the memory cell array 1110 may include a plurality of memory blocks BLK1 to BLKn. Each memory block may be composed of a plurality of pages (e.g., the same number of pages or a different number of pages). Each page may include a plurality of memory cells. Each memory cell or at least some memory cells may store multi-bit data (for example, two or more bits); example embodiments are not limited thereto. Each memory block may correspond to an erase unit, and each page may correspond to a read and/or write unit.

According to some example embodiments, the memory cell array 1110 may be formed in a direction perpendicular to a substrate; however, example embodiments are not limited thereto. A gate electrode layer and an insulation layer may be alternately deposited on the substrate. Each memory block (for example, BLK1) may be connected to one or more string selection lines SSL, a plurality of word lines WL1 to WLm, and one or more ground selection lines GSL. WLk is a selected word line sWL and the remaining word lines (WL1 to WLk−1, WLk+1 to WLm) are unselected word lines uWL. Here, m may be the same as, or greater than, or less than n.

According to some example embodiments, the address decoder 1120 may be connected to the memory cell array 1110 through selection lines SSL and GSL and word lines WL1 to WLm. The address decoder 1120 may select a word line during a program or read operation. The address decoder 1120 may receive the word line voltage VWL from the word line voltage generator 1150 and provide a program voltage or read voltage to the selected word line.

According to some example embodiments, the page buffer circuit 1130 may be connected to the memory cell array 1110 through bit lines BL1 to BLz. Here, z may be the same as, or different from, either m or n. The page buffer circuit 1130 may store (e.g., temporarily store) data to be stored in the memory cell array 1110 and/or data read from the memory cell array 1110. The page buffer circuit 1130 may include page buffers PB1 to PBz connected to respective bit lines. Each page buffer may include a plurality of latches to store or read multi-bit data.

According to some example embodiments, the input/output circuit 1140 may be internally connected to the page buffer circuit 1130 through data lines and may be externally connected to the memory controller (refer to FIG. 1, 1200) through the input/output lines IO1 to IOn. The input/output circuit 1140 may receive program data from the memory controller 1200 during a program operation. In some example embodiments, the input/output circuit 1140 may provide data read from the memory cell array 1110 to the memory controller 1200 during a read operation.

According to some example embodiments, the word line voltage generator 1150 may receive internal power from the control logic 1160 and may generate a word line voltage VWL required to read or write data. The word line voltage VWL may be provided to a selected word line (sWL) and/or unselected word lines (uWL) through the address decoder 1120.

According to some example embodiments, the word line voltage generator 1150 may include a program voltage generator 1151 and a pass voltage generator 1152. The program voltage generator 1151 may generate a program voltage Vpgm to be provided to the selected word line sWL during a program operation. The pass voltage generator 1152 may generate a pass voltage Vpass to be provided to the selected word line sWL and the unselected word lines uWL.

According to some example embodiments, the word line voltage generator 1150 may include a read voltage generator 1153 and a read pass voltage generator 1154. The read voltage generator 1153 may generate a select read voltage Vrd provided to the select word line sWL during a read operation. The read pass voltage generator 1154 may generate a read pass voltage Vrdps provided to unselected word lines uWL. The read pass voltage Vrdps may be a voltage having a magnitude sufficient to turn on memory cells connected to the unselected word lines uWL during a read operation.

According to some example embodiments, the control logic 1160 may control operations such as read, write, and erase of the memory device 1100 using commands CMD, addresses ADDR, and control signals CTRL provided from the memory controller 1200. The addresses ADDR may include a block selection address for selecting one memory block, a row address for selecting one page, and a column address for selecting one memory cell.

Figure 3:
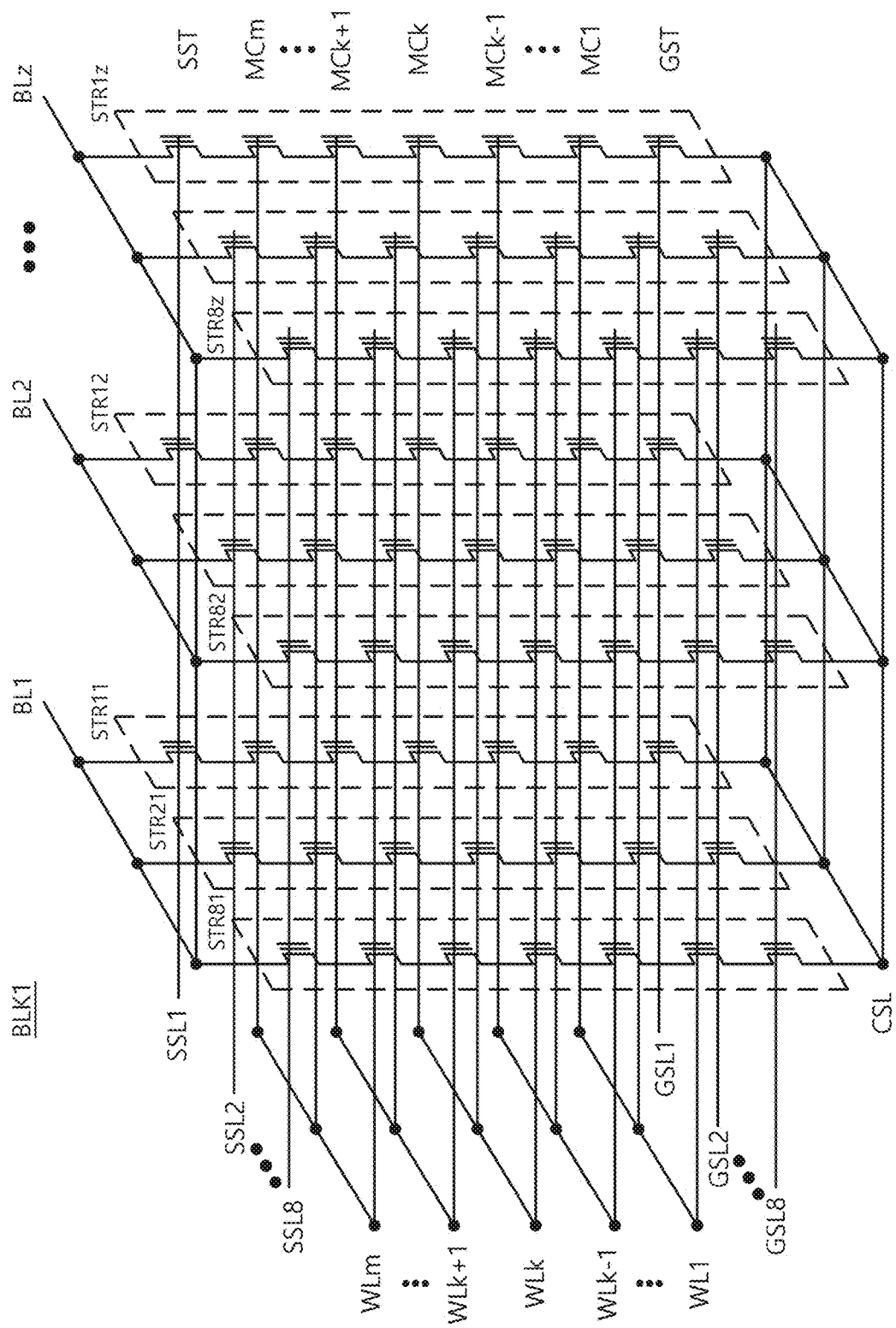
FIG. 3 is a circuit diagram illustrating some example embodiments of a memory block BLK1 of the memory cell array illustrated in FIG. 2

FIG. 3 is a circuit diagram illustrating some example embodiments of a memory block BLK1 of the memory cell array illustrated in FIG. 2. Referring to FIG. 3, in the memory block BLK1, a plurality of cell strings STR11 to STR8z may be formed between the bit lines BL1 to BLz and a common source line CSL. Each cell string includes a string selection transistor SST, a plurality of memory cells MC1 to MCm, and a ground selection transistor GST.

According to some example embodiments, the string selection transistors SST may be connected with string selection lines SSL1 to SSL8. The ground selection transistors GST may be connected with ground selection lines GSL1 to GSL8. The string selection transistors SST may be connected with the bit lines BL1 to BLz, and the ground selection transistors GST may be connected with the common source line CSL. Although eight ground selection lines GSL1 to GSL8 are illustrated, example embodiments are not limited thereto.

According to some example embodiments, the first to m-th word lines WL1 to WLm may be connected with the plurality of memory cells MC1 to MCm in a row direction. The first to z-th bit lines BL1 to BLz may be connected with the plurality of memory cells MC1 to MCm in a column direction.

According to some example embodiments, the first word line WL1 may be placed above the first to eighth ground selection lines GSL1 to GSL8. The first memory cells MC1 that are placed at the same height from the substrate may be connected with the first word line WL1. In a similar manner, the second to m-th memory cells MC2 to MCm that are placed at the same heights from the substrate may be respectively connected with the second to m-th word lines WL2 to WLm.

Figure 4:
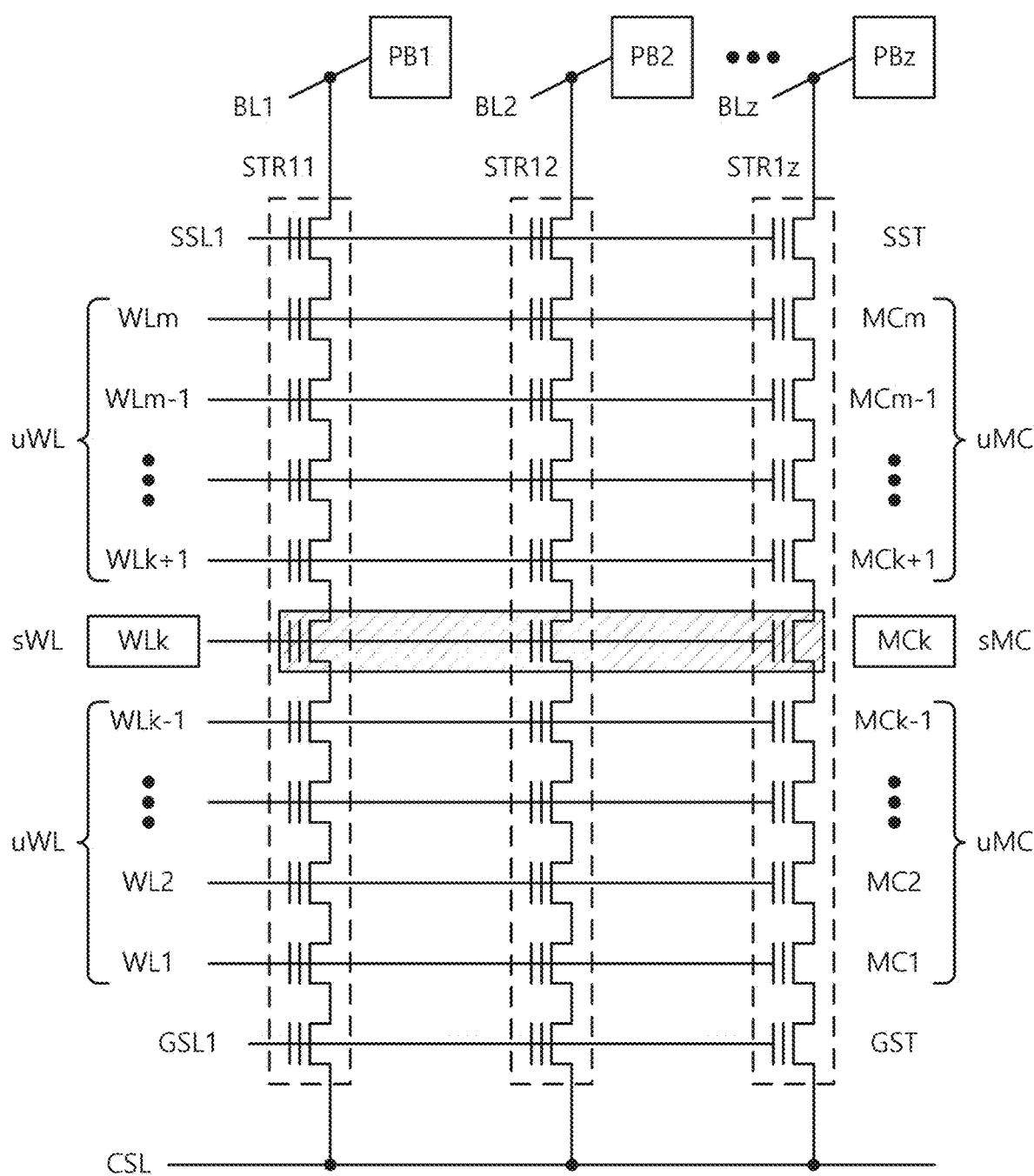
FIG. 4 is a circuit diagram illustrating cell strings selected by the first string selection line from among the cell strings of the memory block BLK1 illustrated in FIG. 3.

FIG. 4 is a circuit diagram illustrating cell strings selected by the first string selection line SSL1 from among the cell strings of the memory block BLK1 illustrated in FIG. 3. The one-one to one-z cell strings STR11 to STR1z may be selected by the first string selection line SSL1. The one-one to one-z cell strings STR11 to STR1z may be connected to the first to z-th bit lines BL1 to BLz, respectively. The first to z-th page buffers PB1 to PBz may be connected to the first to z-th bit lines BL1 to BLz, respectively.

According to some example embodiments, the one-one cell string STR11 may be connected to the first bit line BL1 and the common source line CSL. The one-one cell string STR11 may include string selection transistors SST selected by the first string selection line SSL1, first to m-th memory cells MC1 to MCm connected to the first to m-th word lines WL1 to WLm, and ground selection transistors GST selected by the first ground selection line GSL1. The one-two cell string STR12 may be connected to the second bit line BL2 and the common source line CSL. The one-z cell string STR1z may be connected to the z-th bit line BLz and the common source line CSL.

According to some example embodiments, the first word line WL1 and the m-th word line WLm may be edge word lines (edge WL). The second word line WL2 and the (m−1)-th word line WLm−1 may be edge adjacent word lines. The k-th word line WLk may be a selected word line sWL. The (k−1)-th word line WLk−1 and the (k+1)-th word line WLk+1 may be adjacent word lines adjacent to the selected word line. When the k-th word line WLk is the selected word line sWL, the remaining word lines WL1 to WLk−1 and WLk+1 to WLm may be unselected word lines uWL.

According to some example embodiments, the first memory cells MC1 and the m-th memory cells MCm may be edge memory cells. The second memory cells MC2 and the (m−1)-th memory cells MCm−1 may be edge adjacent memory cells. The k-th memory cells MCk may be selected memory cells sMC. The (k−1)-th memory cells MCk−1 and the (k+1)-th memory cells MCk+1 may be memory cells adjacent to the selected memory cells (adjacent MC). When the k-th memory cells MCk are selected memory cells sMC, the remaining memory cells MC1 to MCk−1 and MCk+1 to MCm may be unselected memory cells uMC.

According to some example embodiments, a set of memory cells selected by one string selection line and connected to one word line may be one page. For example, memory cells selected by the first string selection line SSL1 and connected to the k-th word line WLk may be one page. For example, eight pages may be configured on the k-th word line WLk; however, example embodiments are not limited to eight pages. Among the eight pages, a page connected to the first string selection line SSL1 is a selected page, and pages connected to the second to eighth string selection lines SSL2 to SSL8 are unselected pages.

Figure 5:
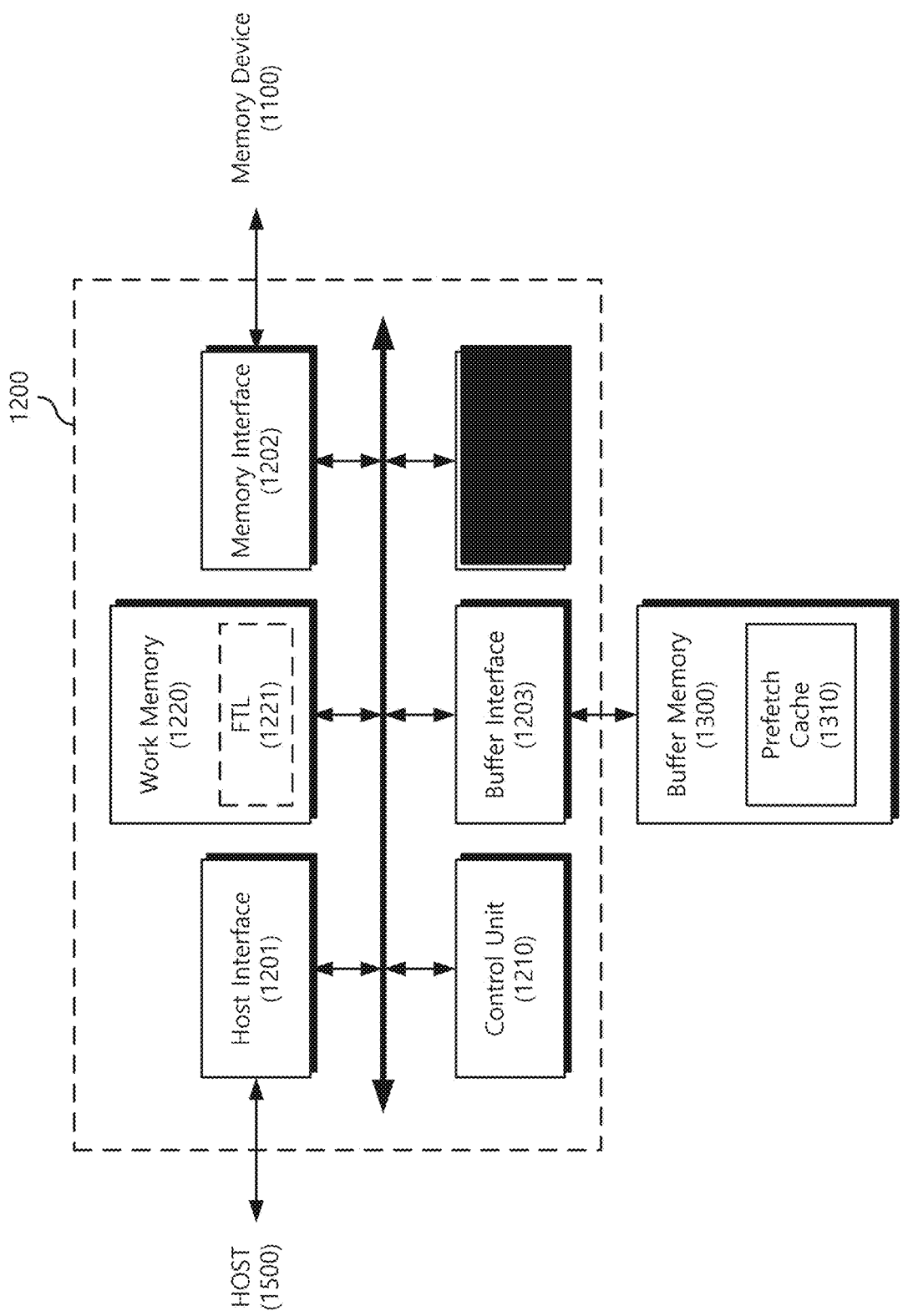
FIG. 5 is a block diagram illustrating some example embodiments of the memory controller of FIG. 1.

FIG. 5 is a block diagram illustrating some example embodiments of the memory controller of FIG. 1. Referring to FIG. 5, the memory controller 1200 may include a host interface 1201, a memory interface 1202, a buffer interface 1203, a control unit 1210, a work memory 1220, and a prefetch manager 1230.

Although not illustrated in FIG. 5, the memory controller 1200 may further include various other components. For example, the memory controller 1200 may further include one or more of an ECC circuit generating an error correction code (ECC) to correct fail bits or error bits of data received from the memory device 1100, or a command generation module generating a command (CMD) for controlling memory operations according to a request received from the host 1500.

According to some example embodiments, the host interface 1201 may provide an interface between the host 1500 and the memory controller 1200. Standard interfaces include various interface methods such as one or more of advanced technology attachment (ATA), serial ATA (SATA), external SATA (e-SATA), small computer small interface (SCSI), serial attached SCSI (SAS), peripheral component interconnection (PCI), and PCI express (PCI-E), IEEE 1394, universal serial bus (USB), secure digital (SD) card, multimedia (MMC) card, embedded multimedia (eMMC) card, universal flash storage (UFS), and/or compact flash (CF) card, etc.

According to some example embodiments, the memory interface 1202 may provide an interface between the memory device 1100 and the memory controller 1200. For example, write and/or read data may be transmitted to and/or received from the memory device 1100 through the memory interface 1202. The memory interface 1202 may provide commands and addresses to the memory device 1100. Additionally or alternatively, the memory interface 1202 may provide data read from the memory device 1100 to the memory controller 1200.

According to some example embodiments, the buffer interface 1203 may provide an interface between the buffer memory 1300 and the memory controller 1200. For example, data temporarily stored in the buffer memory 1300 may be transmitted to and received from the buffer memory 1300 through the buffer interface 1203. The buffer interface 1203 may provide prefetch data received from the memory device 1100 to the buffer memory 1300.

According to some example embodiments, the control unit 1210 may include a central processing unit or a microprocessor, and may control the overall operation of the memory controller 1200. The control unit 1210 may drive firmware loaded in the work memory 1220 to control the memory controller 1200.

According to some example embodiments, the work memory 1220 may be implemented with various memories, for example, at least one of a cache memory, a DRAM, a SRAM, a PRAM, and a flash memory. The work memory 1220 may drive a flash translation layer 1221 under a control of the control unit 1210. The flash translation layer 1221 may perform address mapping operations on a page-by-page or block-by-block. The flash translation layer 1221 may convert a logical address received from the host 1500 into a physical address in the memory device 1100.

According to some example embodiments, the prefetch manager 1230 may monitor a workload received through the host interface 1201. For example, the prefetch manager 1230 may perform a prefetch operation when a sequential workload is received through the host interface 1201. The prefetch manager 1230 may prefetch data corresponding to sequential logical addresses from the memory device 1100 to the buffer memory 1300.

According to some example embodiments, the prefetch manager 1230 may set a prefetch cache 1310 in the buffer memory 1300. When a sequential workload is received through the host interface 1201, the prefetch manager 1230 may determine the size of the prefetch cache 1310 by considering the size of the buffer memory 1300. The prefetch manager 1230 may perform a prefetch operation based on the size of the prefetch cache 1310.

According to some example embodiments, the prefetch manager 1230 may set a group for consecutive prefetch data. The prefetch manager 1230 may connect consecutive prefetch data through a link. The prefetch manager 1230 may release prefetch data connected by a link or set as one group at once. Accordingly, the storage device 1000 may quickly secure empty space in the prefetch cache 1310, and the performance of the storage device 1000 may be improved.

Figure 6:
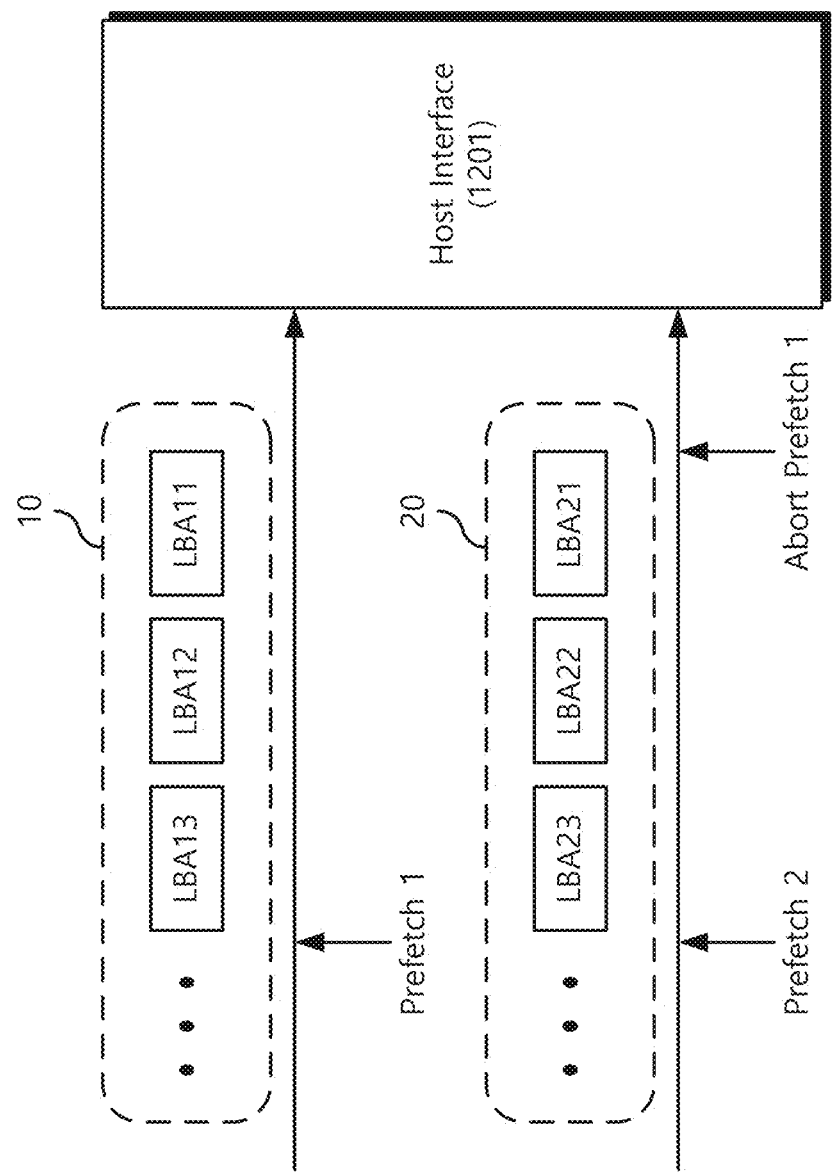
FIG. 6 is a diagram illustrating some example embodiments of a workload received from the host through the host interface of FIG. 5.
Figure 7:
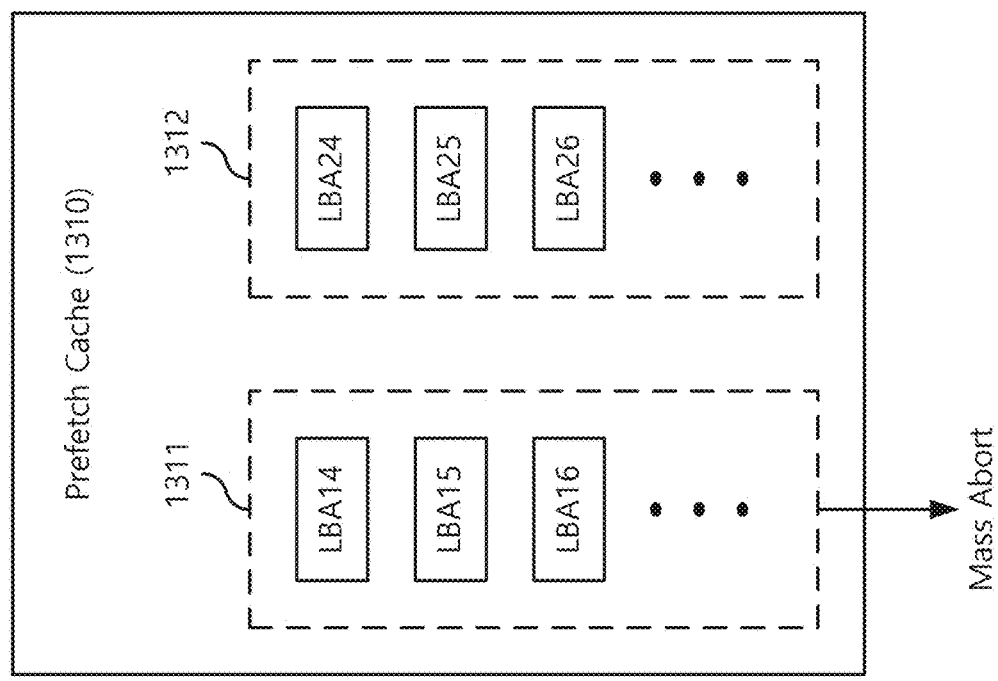
FIG. 7 is a diagram illustrating prefetch data stored in the prefetch cache of FIG. 5.

FIG. 6 is a diagram illustrating some example embodiments of a workload received from the host through the host interface of FIG. 5. FIG. 7 is a diagram illustrating prefetch data stored in the prefetch cache of FIG. 5. Referring to FIGS. 5 to 7, the host interface 1201 may receive workloads 10 and 20 from the host 1500.

According to some example embodiments, the host interface 1201 may receive (e.g., serially and/or in parallel) a first workload 10 corresponding to a first logical addresses (LBA11, LBA12, LBA13, . . . ) from the host 1500. The prefetch manager 1230 may detect whether the first workload 10 is sequential. When the first workload 10 is sequential, the prefetch manager 1230 may perform a first prefetch operation. As an example, the prefetch manager 1230 may detect the sequentiality of the first workload 10 by comparing a specified number of logical addresses (for example, three addresses).

According to some example embodiments, the prefetch manager 1230 may set the first workload 10 corresponding to the sequential first logical addresses (LBA11, LBA12, LBA13, . . . ) to a first prefetch group 1311. The prefetch manager 1230 may prefetch first prefetch group data corresponding to the first prefetch group 1311 from the memory device 1100 to the buffer memory 1300. The prefetch manager 1230 may establish links to each of the first prefetch group data.

According to some example embodiments, the host interface 1201 may receive (e.g., serially and/or in parallel) second workload 20 corresponding to second logical addresses (LBA21, LBA22, LBA23, . . . ) which are not consecutive with the sequential first logical addresses (LBA11, LBA12, LBA13, . . . ) from the host 1500. When the first workload 10 and the discontinuous or noncontiguous second workload 20 are received, the prefetch manager 1230 may release the first prefetch group data corresponding to the first prefetch group 1311 at once. The prefetch manager 1230 may delete the first prefetch group data from the prefetch cache 1310. Accordingly, the prefetch cache 1310 may quickly secure empty space for prefetching.

According to some example embodiments, the prefetch manager 1230 may detect whether the second workload 20 is sequential or contiguous. When the second workload 20 is sequential, the prefetch manager 1230 may perform a second prefetch operation. The prefetch manager 1230 may set the second workload 20 corresponding to the second logical addresses (LBA21, LBA22, LBA23, . . . ) to a second prefetch group 1312. The prefetch manager 1230 may prefetch second prefetch group data corresponding to the second prefetch group 1312 from the memory device 1100 to the buffer memory 1300. The prefetch manager 1230 may establish links to each other of the second prefetch group data.

Figure 8:
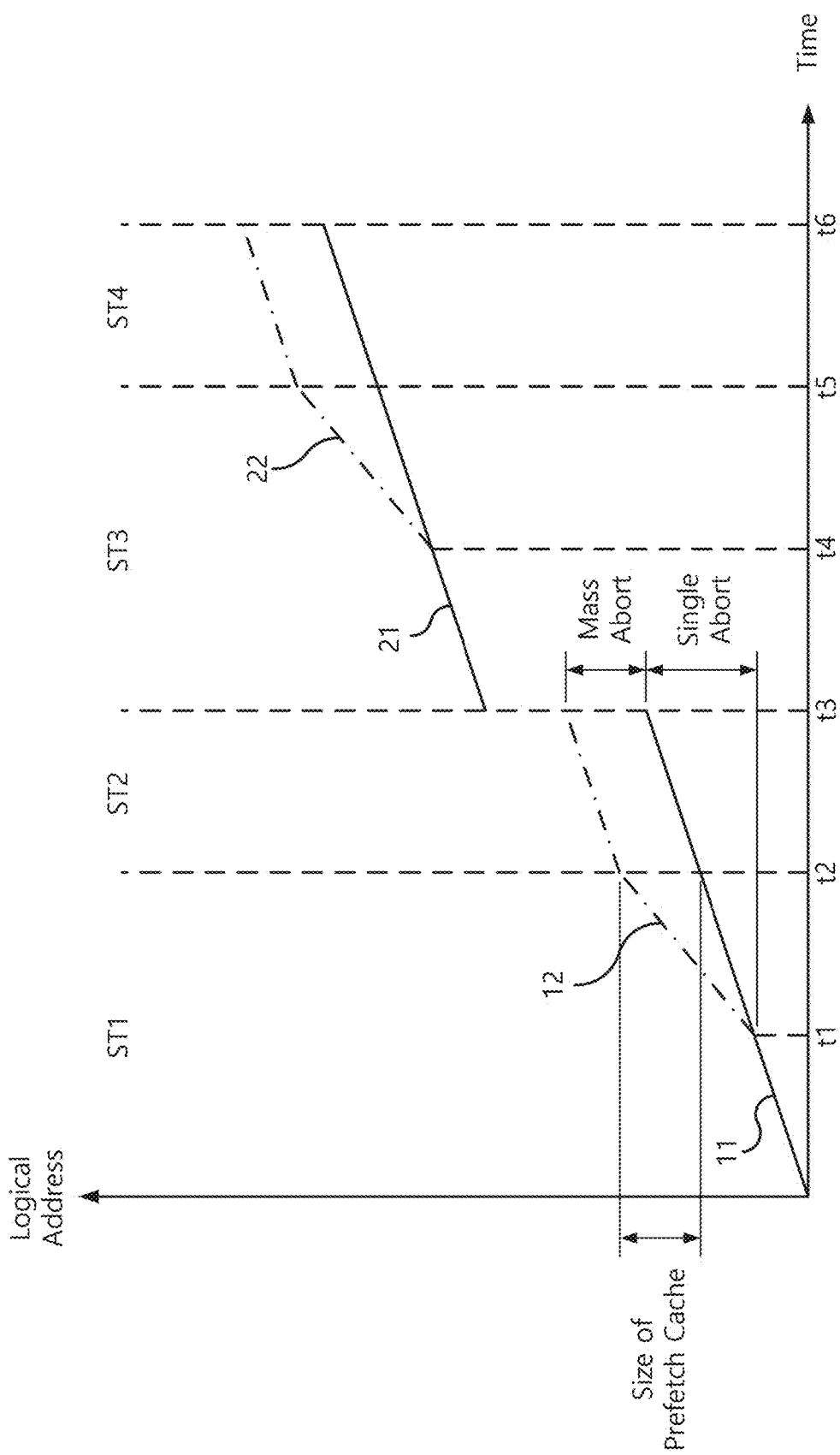
FIG. 8 is a diagram illustrating some example embodiments of addresses prefetched by the prefetch manager of FIG. 5 over time.
Figure 9:
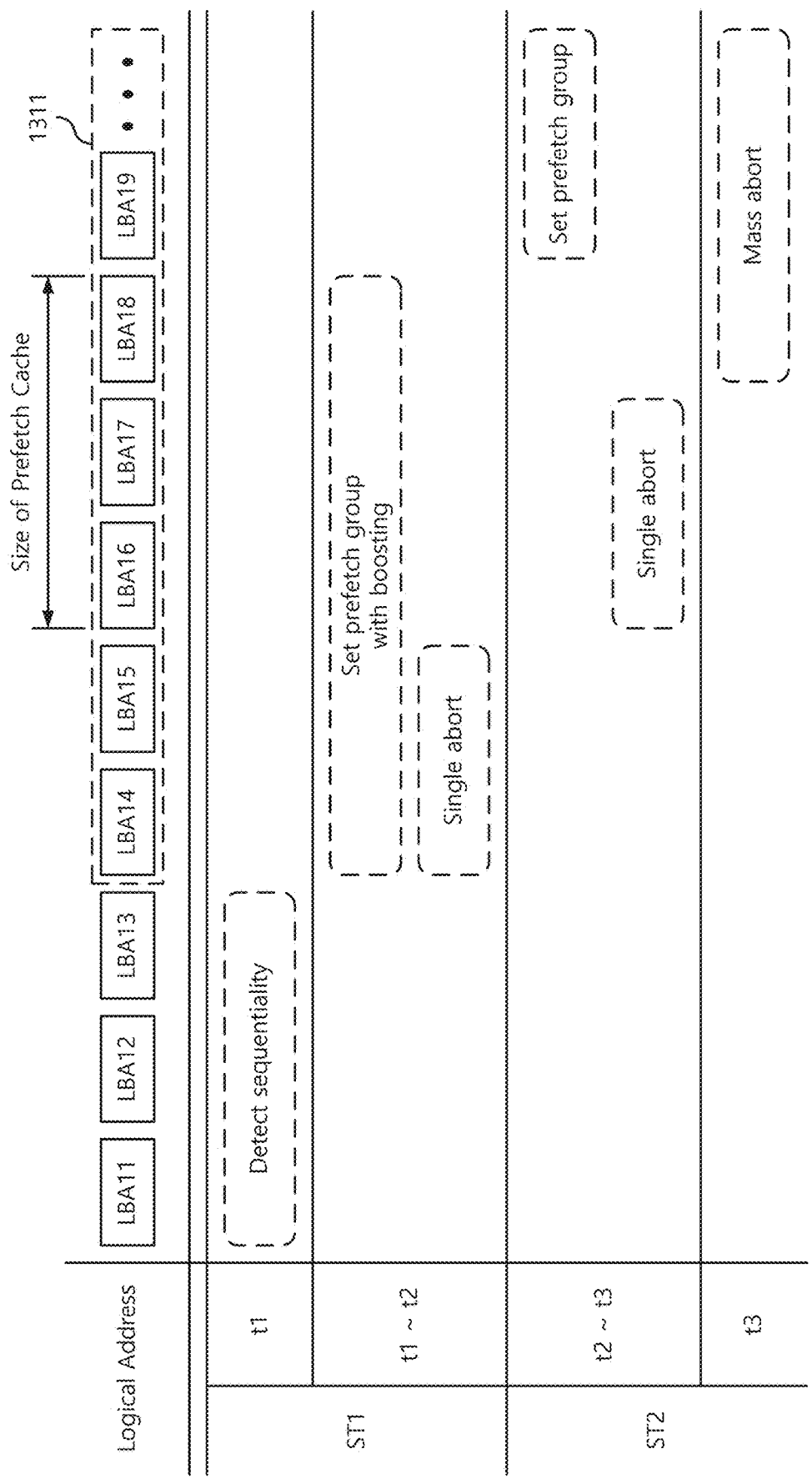
FIG. 9 is a diagram illustrating some example embodiments of operations performed by the prefetch manager of FIG. 5 in the first stage and the second stage of FIG. 8.

FIG. 8 is a diagram illustrating some example embodiments of addresses prefetched by the prefetch manager of FIG. 5 over time. FIG. 9 is a diagram illustrating some example embodiments of operations performed by the prefetch manager of FIG. 5 in the first stage and the second stage of FIG. 8. Referring to FIGS. 5 to 9, the prefetch manager 1230 may prefetch data of the memory device 1100 into the buffer memory 1300 or release data prefetched in the buffer memory 1300 according to a first stage ST1, a second stage ST2, a third stage ST3, and a fourth stage ST4.

According to some example embodiments, in the first stage ST1, the prefetch manager 1230 may detect a first workload 10 corresponding to a first logical addresses 11 (for example, LBA11, LBA12, LBA13, . . . ). The prefetch manager 1230 may determine whether the first logical addresses 11 corresponding to the first workload 10 are sequential (or contiguous) at a first time point t1.

According to some example embodiments, the prefetch manager 1230 may determine the sequentiality or contiguousness of the first workload 10 based on a specified number of logical addresses. As an example, the prefetch manager 1230 may detect whether an eleventh logical address LBA11, a twelfth logical address LBA12, and a thirteenth logical address LBA13 are sequential. When the eleventh logical address LBA11, the twelfth logical address LBA12, and the thirteenth logical address LBA13 are sequential, the prefetch manager 1230 may determine that the first workload 10 is sequential.

According to some example embodiments, at the first time point t1, when the first workload 10 is detected to be sequential, the prefetch manager 1230 may set a first prefetch group 1311. The prefetch manager 1230 may determine logical addresses 12 (hereinafter referred to as first prefetch logical addresses) to be prefetched in advance based on the first logical addresses 11. The prefetch manager 1230 may prefetch (or store) first prefetch group data corresponding to the first prefetch logical addresses 12 from the memory device 1100 to the buffer memory 1300. As an example, the prefetch manager 1230 may prefetch (or store) data corresponding to the first prefetch logical addresses 12 (for example, LBA14, LBA15, LBA16, LBA17, LBA18, LBA19, . . . ) expected to be received after the thirteenth logical address LBA13 from the memory device 1100 to the buffer memory 1300.

According to some example embodiments, between the first time point t1 and the second time point t2, a prefetch speed of the first prefetch group data corresponding to the first prefetch logical addresses 12 may be boosted. For example, between the first time point t1 and the second time point t2, prefetch data corresponding to the fourteenth logical address LBA14, the fifteenth logical address LBA15, the sixteenth logical address LBA16, the seventeenth logical address LBA17, and the eighteenth logical address LBA18 may be prefetched at a boosted speed.

According to some example embodiments, between the first time point t1 and the second time point t2, the prefetch manager 1230 may predict the first logical addresses 11 to be received in the future (for example, the fourteenth logical address LBA14, the fifteenth logical address LBA15, the sixteenth logical address LBA16, the seventeenth logical address LBA17, and the eighteenth logical address LBA18), and determine the first prefetch logical addresses 12 corresponding to the first logical addresses 11. As an example, the first prefetch logical addresses 12 may be substantially the same as the first logical addresses 11.

According to some example embodiments, physical addresses corresponding to the first prefetch logical addresses 12 may be transmitted to the memory device 1100 before the first logical addresses 11 are received from the host 1500. The first prefetch group data received based on the first prefetch logical addresses 12 may be stored in the prefetch cache 1310 before the first logical addresses 11 are received from the host 1500.

According to some example embodiments, between the first time point t1 and the second time point t2, the prefetch manager 1230 may monitor a prefetch hit ratio. For example, a prefetch hit may mean that prefetched data is used by the host 1500. When the prefetch hit occurs, the prefetch manager 1230 may release the prefetched data one by one on a logical address basis (hereafter referring single prefetch aborting). As an example, between the first time point t1 and the second time point t2, the prefetched data corresponding to the fourteenth logical address LBA14 and the fifteenth logical address LBA15 may be released by the single prefetch aborting.

According to some example embodiments, in the second stage ST2, the first prefetch group data may be prefetched from the memory device 1100 at the same speed as a speed at which the first logical addresses 11 are received. The prefetch manager 1230 may set a size of the prefetch cache 1310 at the first time point t1. The second time point t2 at which a reception speed of the first logical addresses 11 and a prefetch speed of the first prefetch group data are the same may be determined according to the size of the prefetch cache 1310.

According to some example embodiments, between the second time point t2 and the third time point t3, the prefetch manager 1230 may monitor whether the first prefetch group data is in a prefetch hit. Prefetch data in a prefetch hit (for example, data for which the first logical addresses 11 are actually received from the host 1500 and which are performed in the host 1500) may be released by the single prefetch aborting from the buffer memory 1300. As an example, between the second time point t2 and the third time point t3, the prefetch data corresponding to the sixteenth logical address LBA16 and the seventeenth logical address LBA17 may be released by the single prefetch aborting.

According to some example embodiments, at the third time point t3, when the second workload 20 which is not consecutive with the first logical addresses 11 is detected, the prefetch manager 1230 may release all of the first prefetch group data corresponding to the first prefetch group 1311, which was prefetched based on the first prefetch logic addresses 12 beforehand, from the buffer memory 1300 (hereafter referring mass prefetch aborting). For example, at the third time point t3, the prefetch manager 1230 may delete all remaining of the first prefetch group data from the prefetch cache 1310. As an example, the prefetch manager 1230 may release data prefetched after the eighteenth logical address LBA18 by the mass prefetch aborting. Accordingly, the prefetch cache 1310 may quickly secure empty space for prefetching.

According to some example embodiments, in the third stage ST3, the prefetch manager 1230 may detect the second workload 20 corresponding to the second logical addresses 21 (for example, LBA21, LBA22, LBA23, . . . ). The prefetch manager 1230 may determine whether the second logical addresses 21 corresponding to the second workload 20 are sequential at the fourth time point t4. The prefetch manager 1230 may determine the sequentiality of the second workload 20 based on a specified number of logical addresses (for example, a twenty-first logical address LBA21, a twenty-second logical address LBA22, and a twenty-third logical address LBA23).

According to some example embodiments, at the fourth time point t4, when the second workload 20 is detected to be sequential, the prefetch manager 1230 may set a second prefetch group 1312. The prefetch manager 1230 may determine second prefetch logical addresses 22 corresponding to the second logical addresses 21. The prefetch manager 1230 may prefetch (or store) second prefetch group data corresponding to the second prefetch logical addresses 22 from the memory device 1100 to the buffer memory 1300.

According to some example embodiments, between the fourth time point t4 and the fifth time point t5, a prefetch speed of the second prefetch group data corresponding to the second prefetch logical address 22 may be boosted. The prefetch manager 1230 may predict the second logical address 21 to be received in the future and determine the second prefetch logical addresses 22 corresponding to the second logical address 21. As an example, the second prefetch logical addresses 22 may be substantially the same as the second logical addresses 21.

According to some example embodiments, between the fourth time point t4 and the fifth time point t5, the prefetch manager 1230 may monitor a prefetch hit ratio. For example, a prefetch hit may mean that prefetch data is used by the host 1500. When the prefetch hit occurs, the prefetch manager 1230 may release the prefetch hit data on a logical address basis by the single prefetch aborting.

According to some example embodiments, in the fourth stage ST4, the second prefetch group data may be prefetched from the memory device 1100 at the same speed as a speed at which the second logical addresses 21 are received. The prefetch manager 1230 may set a size of the prefetch cache 1310 at the fourth time point t4. The fifth time point t5 at which a reception speed of the second logical addresses 21 and the prefetch speed of the second prefetch group data are equal may be determined according to the size of the prefetch cache 1310.

According to some example embodiments, between the fifth time point t5 and the sixth time point t6, the prefetch manager 1230 may monitor whether the second prefetch group data is in the prefetch hit. Prefetch data in the prefetch hit (for example, data for which the first logical addresses 11 are actually received from the host 1500 and which are performed in the host 1500) may be released from the buffer memory 1300 by the single prefetch aborting.

According to some example embodiments, after the sixth time point t6, the second prefetch group data may continue to be prefetched or be released by the mass prefetch aborting. For example, when the continuity of or contiguousness of the second logical addresses 21 is maintained, the prefetch manager 1230 may continue to prefetch the second prefetch group data. When another workload which has no continuity with the second logical addresses 21 is received from the host 1500, the prefetch manager 1230 may release the second prefetch group data by the mass prefetch aborting.

Figure 10:
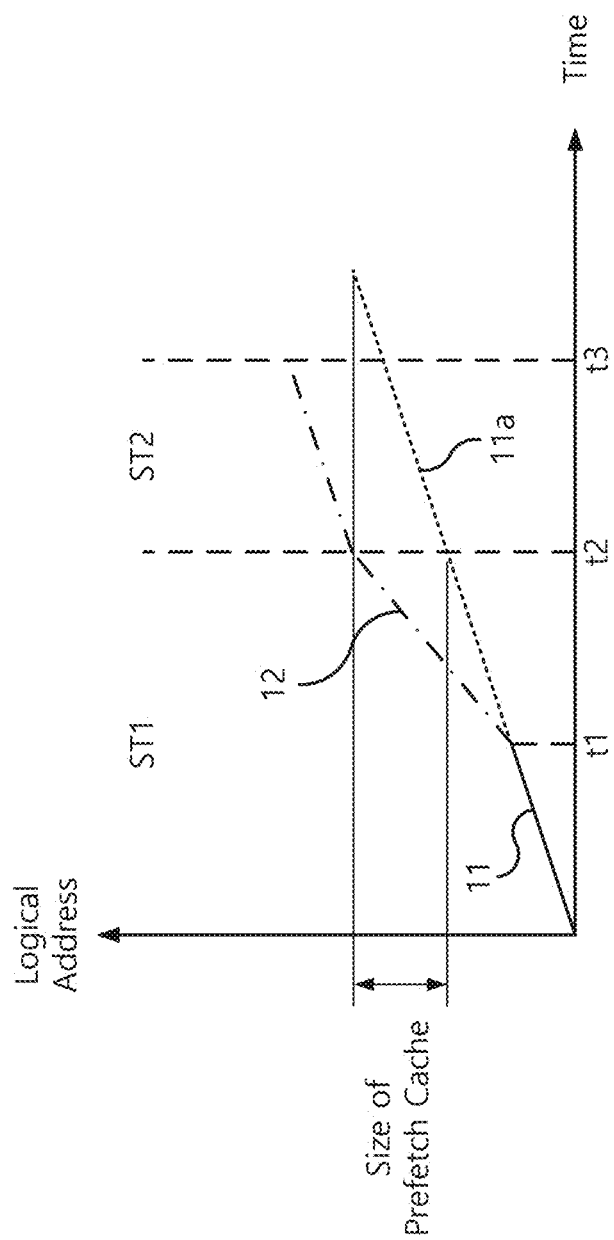
FIG. 10 is a diagram illustrating a method of determining a section in which a prefetch speed is boosted in FIG. 8.

FIG. 10 is a diagram illustrating a method of determining a section in which a prefetch speed is boosted in FIG. 8. Referring to FIGS. 5 to 10, at the first time point t1 of the first stage ST1, the prefetch manager 1230 may detect the sequentiality of the first logical addresses 11 of the first workload 10. The prefetch manager 1230 may predict first expected logical addresses 11a when the first logical addresses 11 continue to be received sequentially. Between the first time point t1 and the second time point t2, the prefetch manager 1230 may store first prefetch group data received based on the first prefetch logical addresses 12 corresponding to the first expected logical addresses 11a in the prefetch cache 1310 before the first logical addresses 11 are received from the host 1500.

According to some example embodiments, at the second time point t2 of the second stage ST2, the first prefetch group data corresponding to the first prefetch logical addresses 12 may be prefetched at the same speed as the reception speed of the first logical addresses 11 from the memory device 1100. The second time point t2 at which the reception speed of the first logical addresses 11 and the prefetch speed of the first prefetch group data are the same may be determined according to the size of the prefetch cache 1310.

Figure 11:
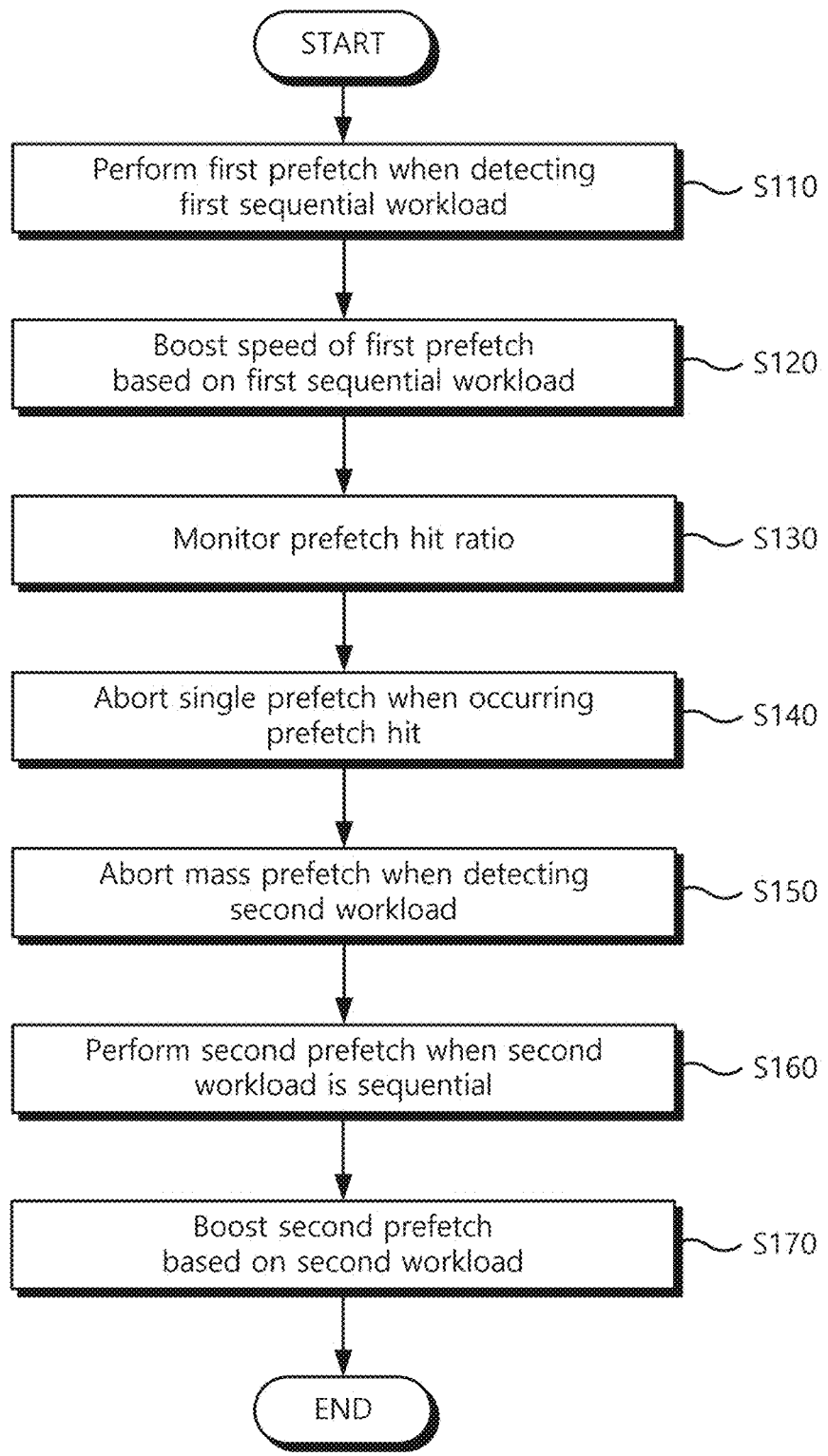
FIG. 11 is a flowchart illustrating a prefetch operation of the memory controller of FIG. 5.

FIG. 11 is a flowchart illustrating a prefetch operation of the memory controller of FIG. 5. Referring to FIGS. 5 to 11, the memory controller 1200 may efficiently manage the prefetch cache 1310 based on a sequential workload of the host 1500.

According to some example embodiments, in operation S110, the memory controller 1200 may detect a first sequential workload of the host 1500 and then perform a first prefetch operation. For example, in the first stage ST1, the prefetch manager 1230 may detect a first workload 10 corresponding to a first logical addresses 11 (for example, LBA11, LBA12, LBA13, . . . ). The prefetch manager 1230 may determine whether the first logical addresses 11 corresponding to the first workload 10 are sequential at the first time point t1. When the first logical addresses 11 are detected to be sequential, the prefetch manager 1230 may determine a first prefetch logical addresses 12 which are prefetched in advance based on the first logical addresses 11. The prefetch manager 1230 may prefetch (or store) first prefetch group data corresponding to the first prefetch logical addresses 12 from the memory device 1100 to the buffer memory 1300.

According to some example embodiments, in operation S120, the memory controller 1200 may boost a speed of the first prefetch operation based on the first sequential workload. For example, between the first time point t1 and the second time point t2, a prefetch speed of the first prefetch group data may be boosted. The memory controller 1200 may prefetch (or store) the first prefetch group data corresponding to the first prefetch logical addresses 12 from the memory device 1100 to the buffer memory 1300 continuously.

According to some example embodiments, between the first time point t1 and the second time point t2, the prefetch manager 1230 may predict the first prefetch logical addresses 12. Before the first logical addresses 11 are received from the host 1500, the prefetch manager 1230 may prefetch the first prefetch group data based on the predicted first prefetch logical addresses 12. The first prefetch group data may be stored in the prefetch cache 1310 before the first logical addresses 11 are received from the host 1500.

According to some example embodiments, in operation S130, the memory controller 1200 may monitor a prefetch hit ratio. For example, in the second stage ST2, the first prefetch group data may be prefetched from the memory device 1100 at the same speed as a speed at which the first logical addresses 11 are received. The prefetch manager 1230 may set a size of the prefetch cache 1310 at the first time point t1. The second time point t2 at which the reception speed of the first logical addresses 11 and the prefetch speed of the first prefetch group data are the same may be determined according to the size of the prefetch cache 1310.

According to some example embodiments, in operation S140, the memory controller 1200 may perform single prefetch aborting when a prefetch hit occurs. For example, between the first time point t1 and the third time point t3, the prefetch manager 1230 may monitor the prefetch hit ratio. A prefetch hit may mean that prefetch data is used by the host 1500. When the prefetch hit occurs, the prefetch manager 1230 may release prefetch hit data on a logical address basis by the single prefetch aborting. Accordingly, the prefetch manager 1230 may maintain the prefetch operation based on the first prefetch logical addresses 12.

As an example, between the first time point t1 and the second time point t2, prefetch data corresponding to the fourteenth logical address LBA14 and the fifteenth logical address LBA15 may be released by the single prefetch aborting. Between the second time point t2 and the third time point t3, a prefetch data corresponding to the sixteenth logical address LBA16 and the seventeenth logical address LBA17 may be released by the single prefetch aborting.

According to some example embodiments, in operation S150, the memory controller 1200 may perform mass prefetch aborting when a second workload from the host 1500 is detected. For example, at the third time point t3, when the second workload 20 which is not consecutive with the first logical addresses 11 is detected, the prefetch manager 1230 may release all of the first prefetch group data corresponding to the first prefetch group 1311, which have been prefetched in advance based on the first prefetch logical addresses 12, in the buffer memory 1300 by the mass prefetch aborting. That is, at the third time point t3, the prefetch manager 1230 may delete all remaining of the first prefetch group data from the prefetch cache 1310. Accordingly, the prefetch cache 1310 may quickly secure empty space for prefetching.

According to some example embodiments, in operation S160, the memory controller 1200 may perform a second prefetch operation when the second workload is sequential. For example, in the third stage ST3, the prefetch manager 1230 may detect the second workload 20 corresponding to the second logical addresses 21 (for example, LBA21, LBA22, LBA23, . . . ). The prefetch manager 1230 may determine whether the second logical addresses 21 corresponding to the second workload 20 are sequential at the fourth time point t4. When the second logical addresses 21 are detected to be sequential, the prefetch manager 1230 may determine the second prefetch logical addresses 22 which are prefetched in advance based on the second logical addresses 21. The prefetch manager 1230 may prefetch (or store) second prefetch group data corresponding to the second prefetch logical addresses 22 from the memory device 1100 to the buffer memory 1300.

According to some example embodiments, in operation S170, the memory controller 1200 may boost a speed of the second prefetch operation based on the second workload. For example, between the fourth time point t4 and the fifth time point t5, a prefetch speed of the second prefetch group data may be boosted. The memory controller 1200 may prefetch (or store) the second prefetch group data corresponding to the second prefetch logical addresses 22 from the memory device 1100 to the buffer memory 1300 continuously.

According to some example embodiments, between the fourth time point t4 and the fifth time point t5, the prefetch manager 1230 may predict the second prefetch logical addresses 22. Before the second logical addresses 21 are received from the host 1500, the prefetch manager 1230 may prefetch the second prefetch group data based on the predicted second prefetch logical addresses 22. The second prefetch group data may be stored in the prefetch cache 1310 before the second logical addresses 21 are received from the host 1500.

According to some example embodiments, in the fourth stage ST4, the second prefetch group data may be prefetched from the memory device 1100 at the same speed as a speed at which the second logical addresses 21 are received. The prefetch manager 1230 may set a size of the prefetch cache 1310 at the fourth time point t4. The fifth time point t5 at which a reception speed of the second logical addresses 21 and the prefetch speed of the second prefetch group data are equal may be determined according to the size of the prefetch cache 1310.

Figure 12:
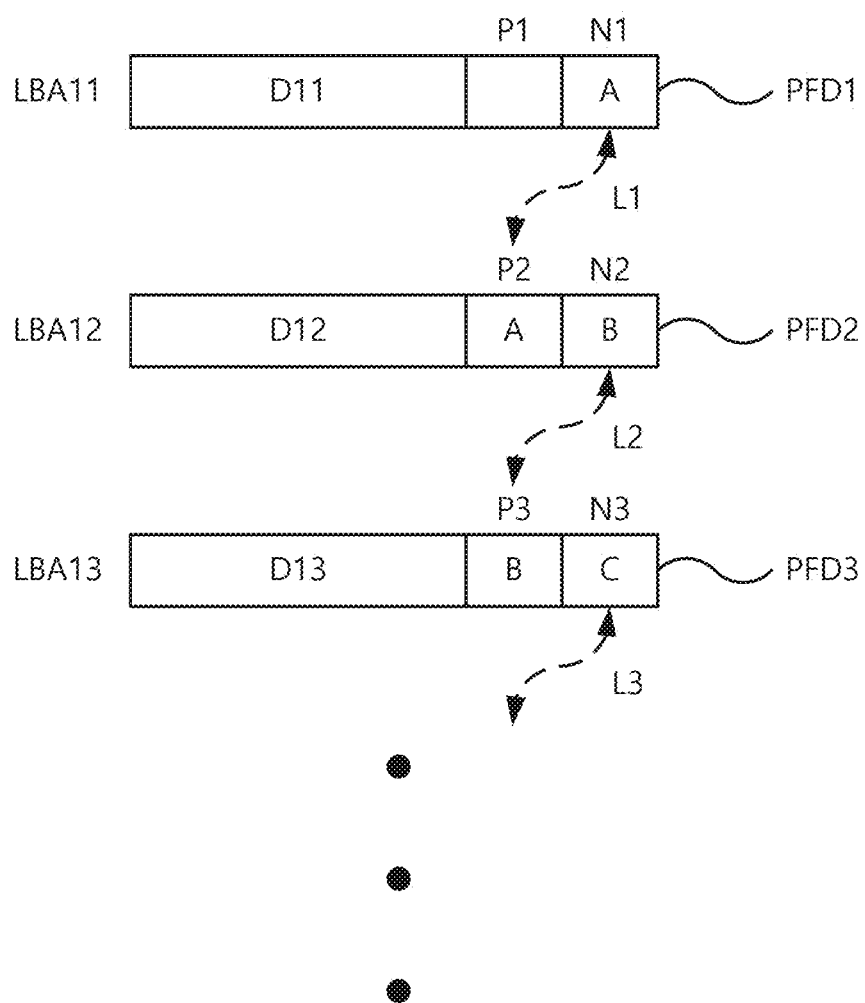
FIG. 12 is a diagram illustrating a method of linking the prefetch data included in the first prefetch group of FIG. 7.

FIG. 12 is a diagram illustrating a method of linking the prefetch data included in the first prefetch group of FIG. 7. Referring to FIG. 12, prefetch data included in the first prefetch group 1311 may include a previous tag and a next tag.

According to some example embodiments, first prefetch data PFD1 corresponding to an eleventh logical address LBA11 may include first user data D11, a first previous tag P1, and a first next tag N1. Since there is no prefetch data preceding the first prefetch data PFD1, the first previous tag P1 may be empty. Second prefetch data PFD2 corresponding to a twelfth logical address LBA12 may include second user data D12, a second previous tag P2, and a second next tag N2. The second previous tag P2 may be the same as the first next tag N1. Third prefetch data PFD3 corresponding to a thirteenth logical address LBA13 may include third user data D13, a third previous tag P3, and a third next tag N3. The third previous tag P3 may be the same as the second next tag N2.

As described above, the prefetch manager 1230 may add a tag to the prefetch data to form a link between the first prefetch group data. The first next tag N1 and the second previous tag P2 may form a first link L1. The second next tag N2 and the third previous tag P3 may form a second link L2. The third next tag N3 and the fourth previous tag may form a third link L3.

Figure 13:
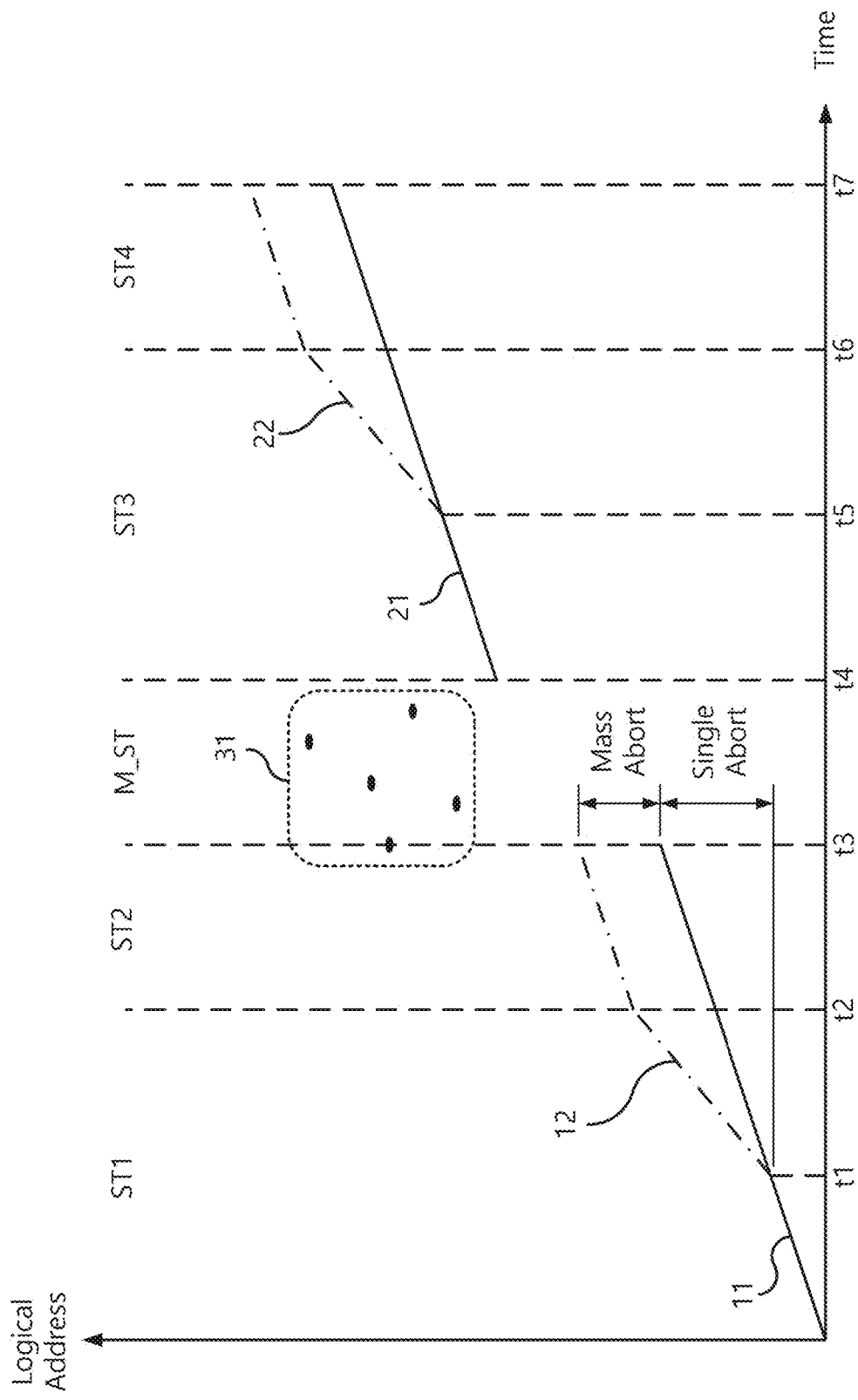
FIG. 13 is a diagram illustrating some example embodiments of addresses prefetched by the prefetch manager of FIG. 5 over time.

FIG. 13 is a diagram illustrating various example embodiments of addresses prefetched by the prefetch manager of FIG. 5 over time. Referring to FIGS. 5 and 13, the prefetch manager 1230 may prefetch data of the memory device 1100 to the buffer memory 1300 or release prefetched data from the buffer memory 1300 according to a first stage ST1, a second stage ST2, a middle stage M_ST, a third stage ST3, and a fourth stage ST4. An operation of the prefetch manager 1230 in the first stage ST1, the second stage ST2, the third stage ST3, or the fourth stage ST4 may be the same or similar to that of FIG. 8. Accordingly, description of the operation of the prefetch manager 1230 in the first stage ST1, second stage ST2, third stage ST3, or fourth stage ST4 is omitted.

According to some example embodiments, between the third time point t3 and the fourth time point t4, the memory controller 1200 may receive discontinuous logical addresses 31 from the host 1500. Accordingly, at the third time point t3, the prefetch manager 1230 may release the first prefetch group data corresponding to the first prefetch logical addresses 12 from the buffer memory 1300 by the mass prefetch aborting. While receiving the discontinuous logical addresses 31, the prefetch manager 1230 may not perform a prefetch operation.

According to some example embodiments, when second logical addresses 21 are received between the fourth time point t4 and the fifth time point t5, the prefetch manager 1230 may determine whether the second logical addresses 21 are sequential. When the second logical addresses 21 are sequential, the prefetch manager 1230 may determine second prefetch logical addresses 22 corresponding to the second logical addresses 21. The prefetch manager 1230 may newly prefetch second prefetch group data corresponding to the second prefetch logical addresses 22 at the fifth time point t5.

Figure 14:
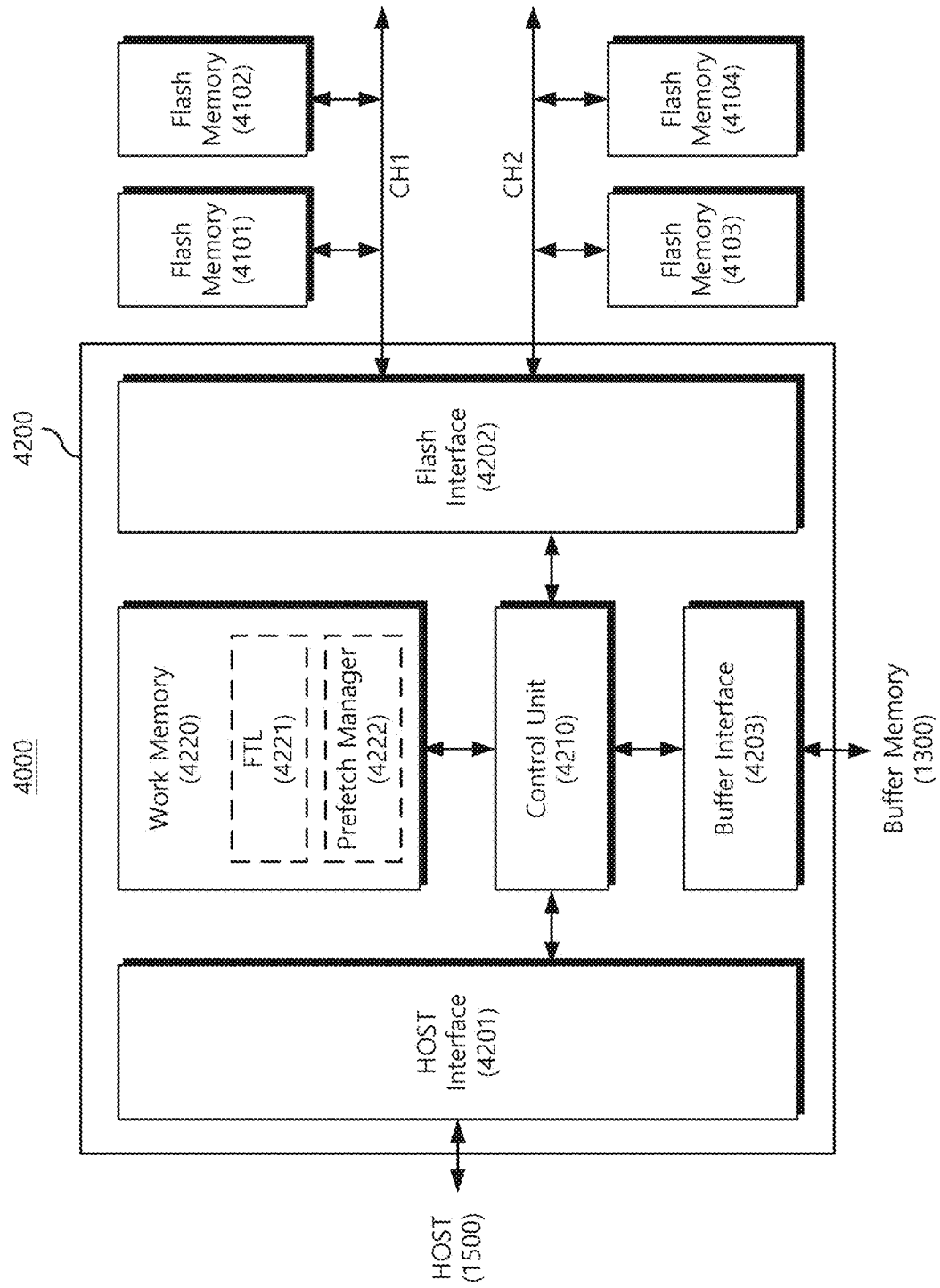
FIG. 14 is a block diagram illustrating an example in which a storage device according to some example embodiments is implemented with a solid state drive (SSD).

FIG. 14 is a block diagram illustrating an example in which a storage device according to some example embodiments of the present disclosure is implemented with a solid-state drive (SSD). Referring to FIG. 14, the SSD 4000 may include a plurality of flash memories 4101 to 4104 and an SSD controller 4200.

According to some example embodiments, the first and second flash memories 4101 and 4102 may be connected to the SSD controller 4200 through a first channel CH1. The third and fourth flash memories 4103 and 4104 may be connected to the SSD controller 4200 through a second channel CH2. The number of channels connected to the SSD controller 4200 may be more than two. The number of flash memories connected to one channel may be more than two.

According to some example embodiments, the SSD controller 4200 may include a host interface 4201, a flash interface 4202, a buffer interface 4203, a control unit 4210, and a work memory 4220. The work memory 4220 may drive a flash translation layer (FTL) 4221 and a prefetch manager 4222.

According to some example embodiments, the SSD controller 4200 may be connected to a host 1500 through the host interface 4201. The SSD controller 4200 may write data to or read data from the flash memory according to a request of the host 1500.

According to some example embodiments, the SSD controller 4200 may be connected to the plurality of flash memories 4101 to 4104 through the flash interface 4202 and connected to a buffer memory 1300 through the buffer interface 4203. The flash interface 4202 may provide data temporarily stored in the buffer memory 1300 to the flash memory through the respective channels CH1 and CH2. The flash interface 4202 may transfer data read from the flash memories 4101 to 4104 to the buffer memory 1300.

According to some example embodiments, the control unit 4210 may analyze and process signals input from the host 1500. The control unit 4210 may control the host 1500 or the flash memories 4101 to 4104 through the host interface 4201 or the flash interface 4202. The control unit 4210 may control the operation of the flash memories 4101 to 4104 according to firmware for driving the SSD 4000.

According to some example embodiments, the work memory 4220 may drive the FTL 4221 under the control of the control unit 4210. The FTL 4221 may be loaded from the flash memories 4101 to 4104 into the work memory 4220 during a boot operation of the SSD 4000. The FTL 4221 may perform address mapping operations, garbage collection operations, metadata management operations, or the like, depending on functions implemented by firmware.

According to some example embodiments, the work memory 4220 may drive the prefetch manager 4222 under the control of the control unit 4210. When a workload corresponding to sequential logical addresses is received from the host 1500, the prefetch manager 4222 may determine expected prefetch logical addresses when the sequential logical addresses are continuously received. The prefetch manager 4222 may group data corresponding to prefetch logical addresses and prefetch them from the flash memories 4101 to 4104 to the buffer memory 1300 as prefetch group data. When a workload which is discontinuous from the prefetch logical addresses is received, the prefetch manager 4222 may simultaneously release the prefetch group data from the buffer memory 1300 (for example, the mass prefetch aborting). The prefetch manager 4222 may have the same or similar functions and features as the prefetch manager 1230 described in FIGS. 5 to 13.

According to some example embodiments, the SSD controller 4200 may manage meta data or cache data to be stored in the flash memories 4101 to 4104. When a sudden power-off occurs, the SSD controller 4200 may back up meta data or cache data stored in the work memory 4220 or the buffer memory 1300 to the flash memories 4101 to 4104.

According to various example embodiments, it may be possible to improve performance of the storage device by efficiently or more efficiently managing the prefetch cache of the buffer memory.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While various example embodiments have been described with reference to embodiments thereof, it will be apparent to those of ordinary skill in the art that various changes and modifications may be made thereto without departing from the spirit and scope as set forth in the following claims. Further, example embodiments are not necessarily mutually exclusive with one another. For example, some example embodiments may include one or more features described with reference to one or more figures and may also include one or more other features described with reference to one or more other figures.

What is claimed is:

1. A storage device comprising:
a memory device;
a buffer memory configured to store partial data among data stored in the memory device; and
a memory controller configured to determine prefetch logical addresses expected to be received sequentially after sequential logical addresses are received from a host, to read prefetch data corresponding to the prefetch logical addresses from the memory device, to store the prefetch data as a prefetch group of in the buffer memory, and to release the prefetch group from the buffer memory in response to a logical address discontinuous with the logical addresses being received from the host.

2. The storage device of claim 1, wherein the memory controller is configured to:
compare specified portion addresses among first logical addresses in response to the first logical addresses being received from the host,
determine whether the first logical addresses are sequential based on the comparison, and
set a prefetch cache in the buffer memory in response to the first logical addresses being sequential.

3. The storage device of claim 2, wherein the memory controller is configured to:
determine expected first prefetch logical addresses in response to the first logical addresses continuing to be received sequentially, and
store first prefetch group data corresponding to the first prefetch logical addresses in the prefetch cache based on a size of the prefetch cache before the first prefetch logical addresses are received from the host.

4. The storage device of claim 3, wherein the memory controller is configured to release prefetch hit data among the first prefetch group data by single prefetch aborting.

5. The storage device of claim 3, wherein the memory controller is configured to release the first prefetch group data by mass prefetch aborting in response to second logical addresses which are discontinuous with the first logical addresses being received from the host.

6. The storage device of claim 5, wherein the memory controller is configured to:
determine whether the second logical addresses are sequential,
determine expected second prefetch logical addresses in response to the second logical addresses continuing to be received sequentially and in response to the second logical addresses being sequential, and
store second prefetch group data corresponding to the second prefetch logical addresses in the prefetch cache before the second prefetch logical addresses are received from the host.

7. The storage device of claim 3, wherein the memory controller is configured to store the first prefetch group data in the prefetch cache at a first speed and receive the first logical addresses at the first speed after a time determined based on the size of the prefetch cache.

8. The storage device of claim 3, wherein
the first prefetch group data includes first prefetch data and second prefetch data,
the first prefetch data includes first user data, a first previous tag, and a first next tag,
the second prefetch data includes second user data, a second previous tag, and a second next tag, and the memory controller is configured to match the first next tag and the second previous tag to connect the first prefetch data and the second prefetch data into one group.

9. A prefetch management method of a storage device, the method comprising:
performing a first prefetch operation in response to receiving a first sequential workload from a host;
boosting a speed of the first prefetch operation based on the first sequential workload;
monitoring whether a prefetch hit occurs in first prefetch group data stored in a buffer memory by the first prefetch operation;
releasing prefetch data in which the prefetch hit occurs among the first prefetch group data by single prefetch aborting; and
releasing the first prefetch group data by mass prefetch aborting in response to receiving a second workload discontinuous with the first sequential workload from the host.

10. The method of claim 9, wherein the performing the first prefetch operation includes prefetching the first prefetch group data corresponding to the first sequential workload from a memory device to the buffer memory.

11. The method of claim 9, wherein the boosting the speed of the first prefetch operation includes storing the first prefetch group data corresponding to the first sequential workload in the buffer memory before the first sequential workload is received.

12. The method of claim 9, further comprising:
determining a time boosting the speed of the first prefetch operation based on a size of the buffer memory.

13. The method of claim 9, wherein the monitoring whether the prefetch hit occurs includes:
after a time determined based on a size of the buffer memory,
storing the first prefetch group data in the buffer memory at a first speed; and
receiving the first sequential workload at the first speed.

14. The method of claim 9, further comprising:
performing a second prefetch operation corresponding to the second workload in response to the second workload being sequential; and
boosting a speed of the second prefetch operation based on the second workload.

15. The method of claim 14, further comprising:
maintaining the speed of the second prefetch operation to be same as a reception speed of the second workload after a time determined based on a size of the buffer memory.

16. A storage device comprising:
a memory device;
a buffer memory including a prefetch cache configured to store prefetch data corresponding to a workload received from a host; and
a memory controller configured to read data corresponding to a sequential workload from the memory device and store the data in the prefetch cache in response to the sequential workload being received from the host,
wherein the memory controller is configured to:
perform a first prefetch operation corresponding to a first workload in response to a first sequential workload being received from the host;
boost a speed of the first prefetch operation based on a size of the prefetch cache; and
release all prefetch data prefetched by the first prefetch operation from the prefetch cache by mass prefetch aborting in response to a second workload discontinuous with the first workload being received from the host.

17. The storage device of claim 16, wherein the memory controller is configured to detect whether the first workload is sequential by comparing specified partial logical addresses included in the first workload in response to the first workload being received.

18. The storage device of claim 16, wherein the memory controller is configured to set the prefetch cache having a specified size within the buffer memory in response to the first workload being detected to be sequential.

19. The storage device of claim 18, wherein the memory controller is configured to maintain the speed of the first prefetch operation to be same as a reception speed of the first workload after a time determined based on the size of the prefetch cache.

20. The storage device of claim 16, wherein the memory controller is configured to release prefetch hit data among a first prefetch group data stored in the prefetch cache through the first prefetch operation by single prefetch aborting.

* * * * *